United States Patent
Baldwin et al.

(10) Patent No.: US 7,330,897 B2
(45) Date of Patent: Feb. 12, 2008

(54) METHODS AND APPARATUS FOR STORAGE AREA NETWORK COMPONENT REGISTRATION

(75) Inventors: Duane Mark Baldwin, Mantorville, MN (US); Hans Hanhsia Lin, San Jose, CA (US); David Lynn Merbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/191,210

(22) Filed: Jul. 9, 2002

(65) Prior Publication Data
US 2004/0010600 A1 Jan. 15, 2004

(51) Int. Cl.
*G06F 15/16* (2006.01)
(52) U.S. Cl. ............... 709/229; 709/220; 709/223; 709/224; 711/112; 707/10; 710/104
(58) Field of Classification Search ........... 709/229, 709/220, 200, 224, 246, 223; 710/105, 200; 711/152, 207; 713/100, 201
See application file for complete search history.

(56) References Cited

U.S. PATENT DOCUMENTS

| | | | |
|---|---|---|---|
| 6,263,445 B1 | 7/2001 | Blumenau | 713/201 |
| 6,269,400 B1 | 7/2001 | Douglas et al. | 709/224 |
| 6,839,747 B1* | 1/2005 | Blumenau et al. | 709/223 |
| 2001/0020254 A1 | 9/2001 | Blumenau et al. | 709/229 |
| 2001/0047463 A1* | 11/2001 | Kamano et al. | 711/163 |
| 2003/0088658 A1* | 5/2003 | Davies et al. | 709/223 |
| 2003/0149752 A1* | 8/2003 | Baldwin et al. | 709/223 |

OTHER PUBLICATIONS

IBM TDB, Supporting Advanced Peer-To-Peer Networking Session Services Extensions Protocals Over Non-Systems Network Architecture Transport Networks, Nov. 1996, vol. 39 No. 11 p. 153-159.
R. Burns et al., Authenticating Network Attached Storage, Jan.-Feb. 2000, IEEE Micro, vol. 20, No. 1, p. 49-57.

* cited by examiner

*Primary Examiner*—Yves Dalencourt
(74) *Attorney, Agent, or Firm*—Kunzler & McKenzie

(57) ABSTRACT

The invention provides, in one aspect, a digital data processing system having an interconnect that provides for registration of components communicating thereon. One or more host devices, storage devices or other components are coupled to the interconnect for communication, at least one of them lacking an ability to self-register with the interconnect. Such a component is referred to herein as a non-compliant component. A registration module coupled with the interconnect performs the registration on behalf of the non-compliant component.

39 Claims, 4 Drawing Sheets

METHODS AND APPARATUS FOR STORAGE AREA NETWORK COMPONENT REGISTRATION

BACKGROUND OF THE INVENTION

The invention pertains to digital data processing and, more particularly, to networks and methods of operation thereof. The invention has application, for example, in managing storage area networks.

In early computer systems, long-term data storage was typically provided by dedicated storage devices, such as tape and disk drives, connected to a data central computer. Requests to read and write data generated by applications programs were processed by special-purpose input/output routines resident in the computer operating system. With the advent of "time sharing" and other early multiprocessing techniques, multiple users could simultaneously store and access data—albeit only through the dedicated storage devices.

With the rise of the personal computer and workstation in the 1980's, demand by business users led to development of interconnection mechanisms that permitted otherwise independent computers to access data on one another's storage devices. Though computer networks had been known prior to this, they typically permitted only communications, not storage sharing.

The prevalent business network that has emerged is the local area network, typically comprising "client" computers (e.g., individual PCs or workstations) connected by a network to a "server" computer. Unlike the early computing systems in which all processing and storage occurred on a central computer, client computers usually have adequate processor and storage capacity to execute many user applications. However, they often rely on the server computer—and its associated battery of disk drives and storage devices—for other than short-term file storage and for access to shared application and data files.

An information explosion, partially wrought by the rise of the corporate computing and, partially, by the Internet, is spurring further change. Less common are individual servers that reside as independent hubs of storage activity. Often many storage devices are placed on a network or switching fabric that can be accessed by several servers (such as file servers and web servers) which, in turn, service respective groups of clients. Sometimes even individual PCs or workstations are enabled for direct access of the storage devices (though, in most corporate environments such is province of server-class computers) on these so-called "storage area networks" or (SANs).

The management of SANs typically involves automated discovery of the SAN physical topology, e.g., the interconnections and relationships among host computers (e.g., servers), storage devices and other components participating in the SAN, and their configurations. This can be accomplished through in-band discovery—that is, by querying designated addresses in the devices or on the network or fabric that connects them. However, the information provided by most in-band discovery mechanisms is limited to how the components' respective physical network endpoints, or ports, are connected. Referring to FIG. 1, for example, in-band discovery might reveal that there are a number of ports connected into the SAN fabric, but it will not reveal in which of those host computers (Host 1, Host 2 or Host 3) the ports are contained.

The art has taken steps toward facilitating SAN management, e.g., in instances where only in-band discovery is possible. An emerging industry standard T11/FC-GS-3 of the American National Standard of Accredited Standards Committee NCITS, for example, proposes a system of "platform" registration, wherein each component (or platform) on a fibre channel fabric registers with a fabric-based service, supplying information such as component name and type, contained fibre channel ports, management addresses, description and location. That information is made available to the other components which can use it, e.g., for storage area network management.

Though platform registration can facilitate SAN management, many SAN components do not practice it. This will likely be the state of affairs for many years to come as manufacturers bring their fibre channel and non-fibre channel (e.g., iSCSI) product lines into conformity with registrations standards such as those provided under T11/FC-GS-3.

SUMMARY OF THE INVENTION

The foregoing are among the object attained by the invention which provides, in one aspect, a digital data processing system having an interconnect that provides for registration of components communicating thereon. One or more host devices, storage devices or other components are coupled to the interconnect for communication, e.g., of commands, data and other information. At least one of the components lacks an ability to self-register with the interconnect and is referred to herein as a non-compliant component. A registration module executing on a digital data processor that is coupled with the interconnect via one (or more) of the components performs the registration on behalf of the non-compliant component.

Related aspects of the invention provide a digital data processing system as described above in which the interconnect operates in accord with a fibre channel protocol. Further related aspects of the invention provide such a system in which the fibre channel interconnect comprises one or more elements, e.g., switches, that define a configuration server that provides the aforesaid registration.

Other aspects of the invention provide a digital data processing system as described above in which the registration module obtains registration information for a non-compliant component from a system administrator or other user (hereinafter, "system administrator"). Related aspects of the invention provide such a system in which the information obtained by the registration module from the administrator includes a name and type of the non-compliant component, as well as a management address list and a node list therefor. Still further related aspects of the invention provide such a system in which that information is obtained from the administrator via a graphical or other user interface provided by a storage area network manager executing on a digital data processor common to the registration module.

In other aspects, the registration module of a system as described above communicates registration information with the interconnect via the storage area network manager and particularly, by way of example, via an agent of the manager executing on one of the components.

In still other aspects, the invention provides a digital data processing system as described above which executes within one of the aforesaid components, communicating with a registration service in the interconnect via the component's host bus adapter. Further aspects of the invention provide a system as described above in which the registration module obtains information necessary to register a non-compliant component from pre-programmed setting and/or from a database. In further related aspects, the registration module can utilize a display console to obtain information from a system administrator for purposes of updating such a database.

Additional aspects of the invention provide a registration module for use in a digital data processing system of the type described above.

Still other aspects of the invention provide methods of operating a digital data processing system and/or registration module in accord with the above.

DETAILED DESCRIPTION OF THE ILLUSTRATED EMBODIMENT

Figure 1:
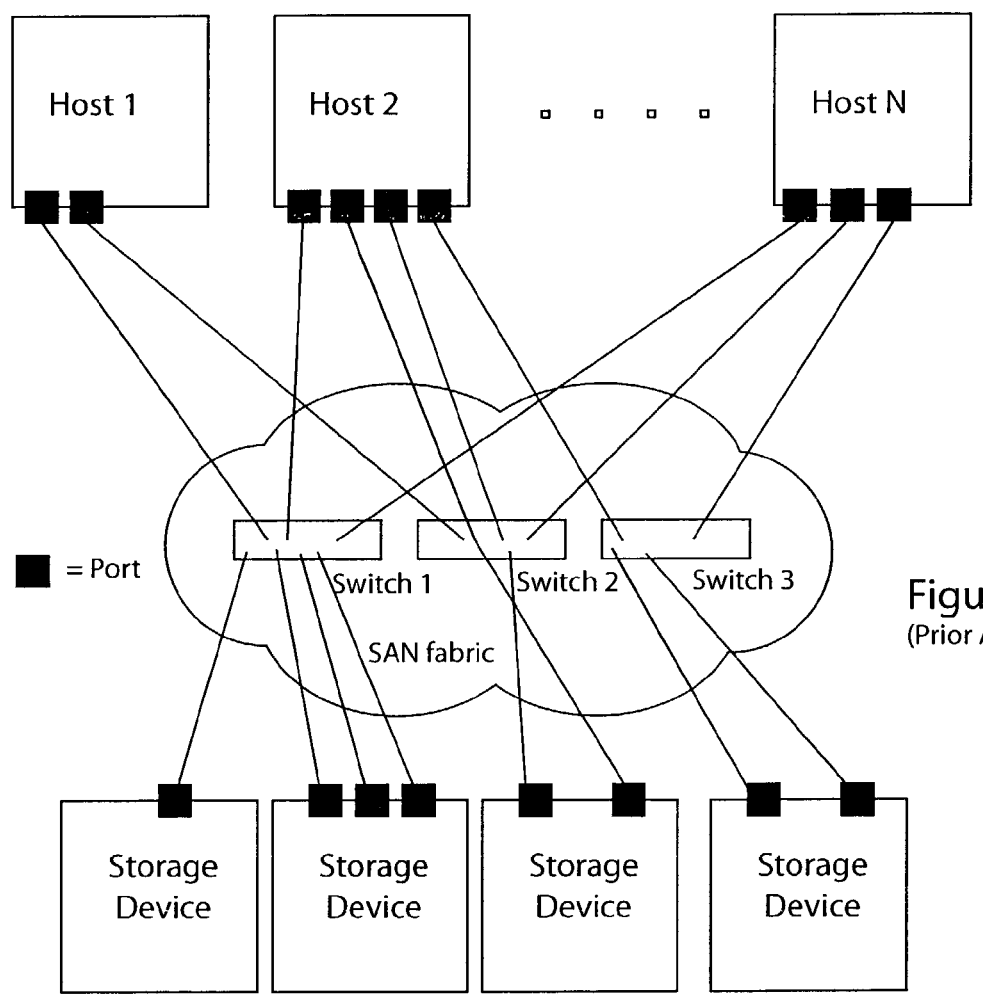
FIG. 1 depicts a storage area network architecture according to the prior art.
Figure 2:
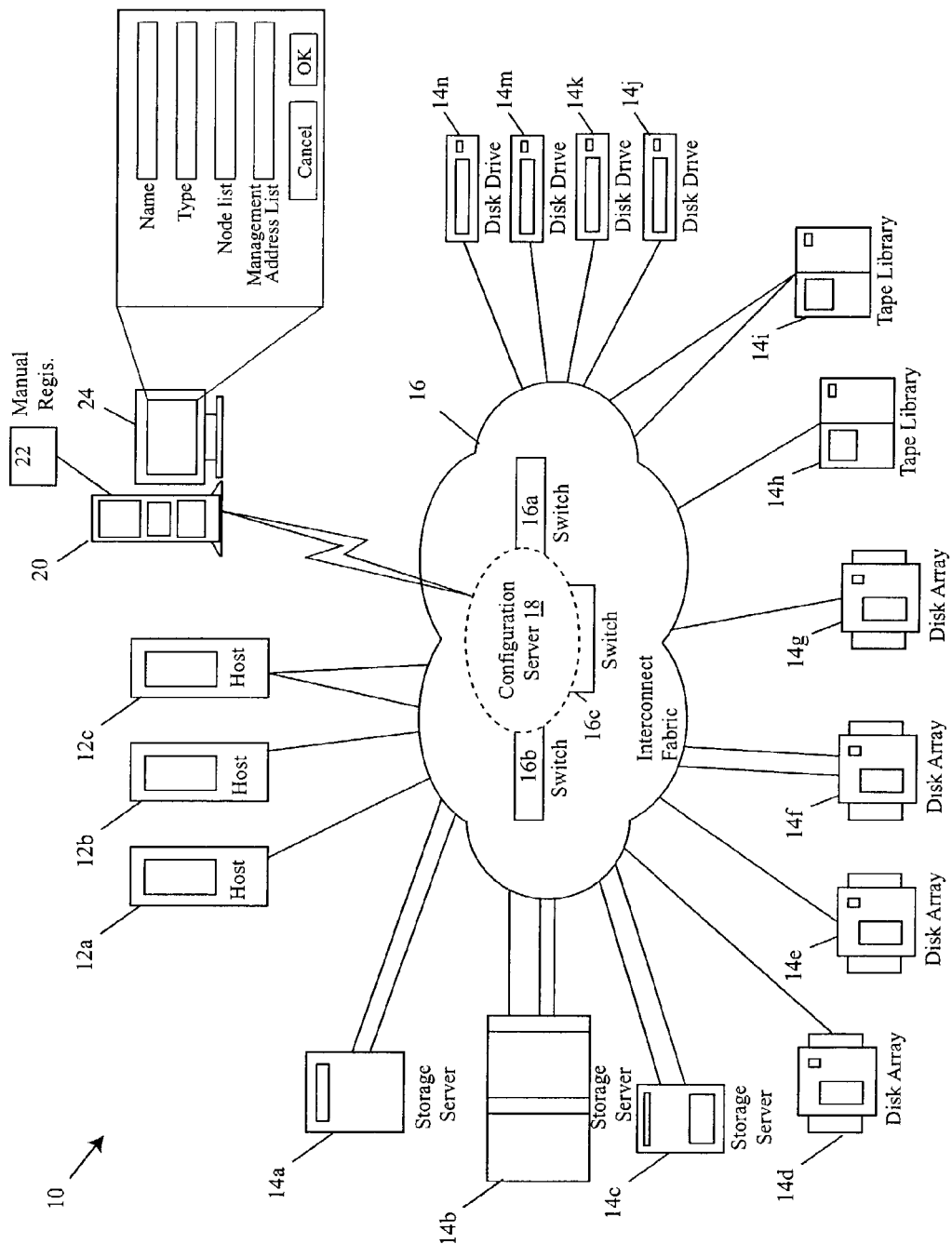
FIG. 2 depicts a storage area network (SAN) embodying a manual registration module according to the invention.

FIG. 2 illustrates an exemplary storage area network (SAN) 10 embodying the invention in which one or more components-including one or more hosts 12a-12c and/or one or more storage devices 14a-14n—communicate with one another via an interconnect fabric 16 having a plurality of interconnect elements, such as, switches 16a-16c. In addition to hosts 12 and storage devices 14, gateways (not shown) and other digital data devices of the type known in the art may be coupled to the interconnect fabric 16.

Illustrated hosts 12 are typically web servers, application servers or file servers (e.g., for client computers not shown in the drawing), graphical workstations and so forth, though they may comprise any digital data devices that access and/or store (collectively, "access") information on the storage devices 14. The hosts 12 are constructed and operated in the conventional manner, as modified in accord with the teachings herein.

Illustrated storage devices 14 comprise apparatus for storing and/or retrieving data. These typically comprise disk drives and arrays of the type conventionally used in storage area networks, though any variety of storage devices (e.g., tape libraries) may be used for this purpose. By way of non-limiting example, the illustrated devices may comprise, or form parts of, storage subsystems, storage servers, storage virtualization systems. Regardless, the storage devices 14 are constructed and operated in the conventional manner, as modified in accord with the teachings herein.

The illustrated SAN includes a manager 20 that provides administrative services with respect to SAN 10. This includes network component discovery, topology reporting, event monitoring, device manager launching and/or network configuration. SAN manager 20 executes on a general purpose or server workstation; though it may be implemented on any general or special purpose digital data device known in the art. A preferred SAN manager 20 is a fibre channel network manager of the type disclosed in copending, commonly assigned application U.S. Ser. No. 09/972,584, entitled "Storage Area Network Methods And Apparatus With Centralized Management," filed Oct. 5, 2001, the teachings of which are incorporated herein by reference. Other network managers, whether commercially available or otherwise, capable of providing services with respect to SAN 10 may be used in addition or instead.

Figure 3:
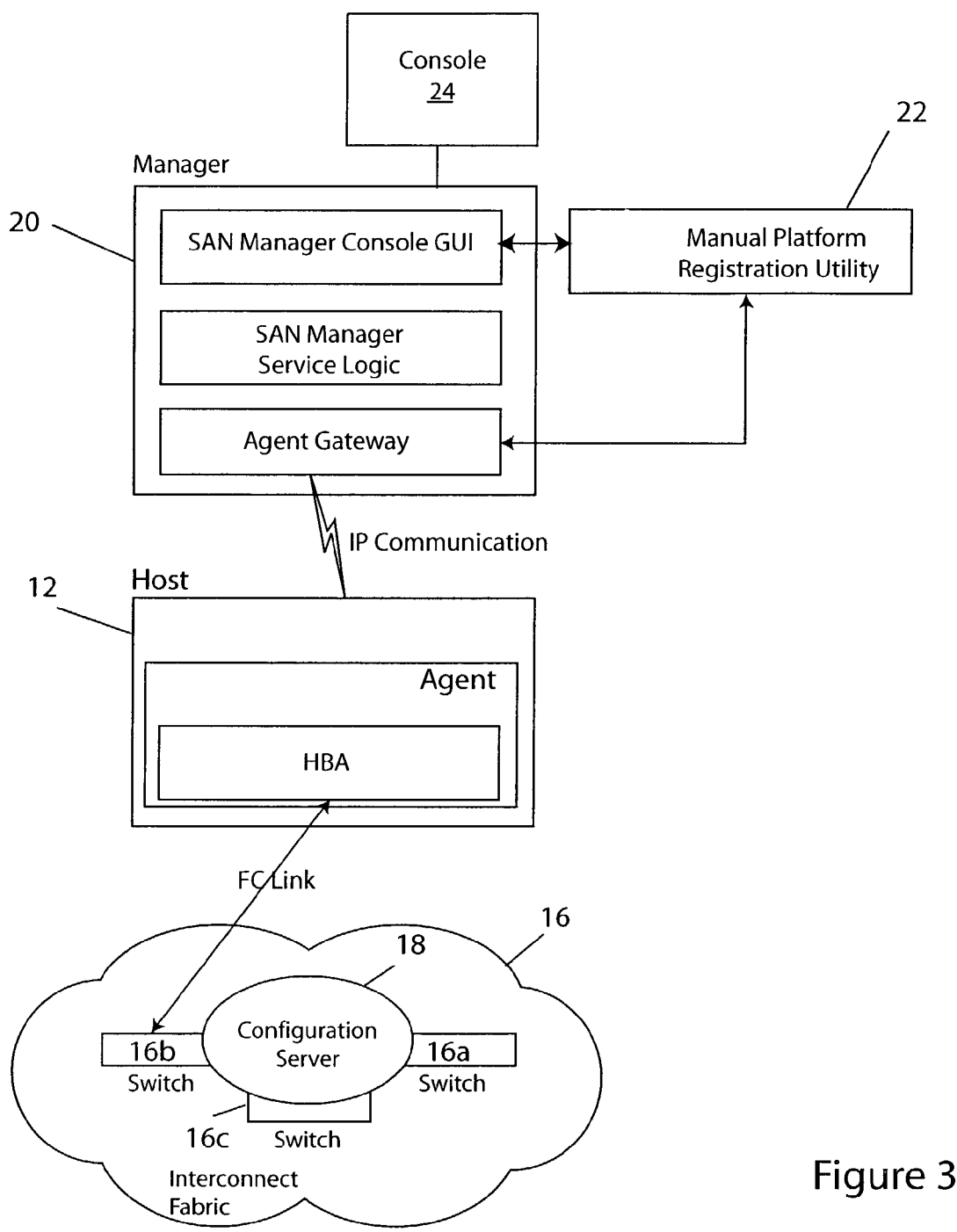
FIG. 3 depicts communication between a registration module of the FIG. 2 and a fibre channel interconnect.

The SAN manager 20 may be coupled directly to the interconnect fabric 16. However, as shown in FIG. 3, in the illustrated embodiment, communications between manager 20 and fabric 16 take place via modules, referred to as agents in incorporated-by-reference application U.S. Ser. No. 09/972,584, residing on one or more of the hosts 12. Those agents communicate with the interconnect through the host bus adapters (HBAs), or other interconnect interfaces, of the respective hosts, e.g., to gather information from, and apply commands and information to, the interconnect on behalf of the manager 20.

A further appreciation of this two-tier mechanism for communication between SAN manager 20 and the interconnect 16 via an agent (or agents) residing on host(s) 12 (e.g., utilizing agent gateway and IP communications link (or other communications connection), all as illustrated in FIG. 3) may be attained by reference to incorporated-by-reference application, U.S. Ser. No. 09/972,584 and particularly, by way of non-limiting example, by reference to FIGS. 4-6 and 36, and the accompanying text thereof, all incorporated by reference herein.

Other embodiments of the invention may utilize alternative mechanisms known in the art to support communications between the SAN manager 20 and the interconnect 16 via the hosts 12 or components on the interconnect 16.

Illustrated console 24 facilitates access by a user or system administrator (hereinafter, "administrator") to the SAN manager 20. This is typically a personal computer or workstation and, indeed, may be the same device on which the SAN manager 20 is embodied. In addition to a processor, the console 24 comprises a display, keyboard and/or other input/output devices (such as a mouse and printer). Other human machine interface (HMI) devices of the variety known in the art may be used in addition or instead (e.g., personal digital assistants, teletype terminals, touch pads, and so forth).

SAN manager 20 utilizes a graphical user interface (GUI) to drive information to the console 24 and/or collect information therefrom. For example, the manager 20 employs the GUI to present a topological display of SAN components 12, 14 and interconnect elements 16a-16c on the console 24. The GUI can likewise be used to present and collect information in regard the provisioning of other services by SAN manager 20 with respect to SAN 10.

Illustrated interconnect 16 comprises a fibre channel fabric, including fibre channel media, switches 16a-16c, and other elements necessary, typical and/or otherwise used to provide fibre channel connectivity between the illustrated devices 12, 14. In alternative embodiments, interconnect 16 utilizes other fabrics, networks or other communications media for transfers between hosts 12 and devices 14. These include interconnects operating in accord with internet protocol and a variety of other protocols known or to be known in the art.

The constituent elements of illustrated fibre channel interconnect 16 define a configuration server 18 of the type contemplated under fibre channel standard T11/FC-GS-3, e.g., as defined in NCITS xxx-200x T11/Project 1356-D/Rev 7.01 (Nov. 28, 2000), promulgated by the American National Standard for Information Technology, hereinafter referred to as the "fibre channel specification," at Section 6.1, the teachings of which are incorporated herein by reference. One or more other services defined under the standard, e.g., directory services, other management services, time services, alias services and key distribution service, may be provided by these or other elements as well. Though depicted as being provided by switches 16a-16c, those skilled in the art will appreciate that the configuration server and/or any of the other services contemplated by the aforementioned standard may be provisioned by other elements of the interconnect 16 as well, and, indeed, by the hosts 12, storage devices 14, server 20 or other components of the SAN.

With respect to the illustrated embodiment, the term "component" refers to a host 12, storage device or other digital data device that is coupled to the interconnect via a node and its associated ports. In this regard, "component" is synonymous with the term "platform device," as used in the fibre channel specification. In embodiments where the interconnect 16 is other than fibre channel, the term "component" refers to digital data devices (again, such as hosts, storage devices and so forth) that couple for communication with the respective interconnects. With further respect to the illustrated embodiment, the term "element" refers to devices that form the interconnect fabric 16. In this regard, "element" is synonymous with "Fibre Channel component," as used in the fibre channel specification. In embodiments where the interconnect 16 is other than fibre channel, the term "element" correspondingly refers to devices that make up the respective interconnects.

Per the fibre channel specification, components on a fibre channel interconnect (such as interconnect 16) are intended to self-register with the configuration server so that management applications, such as SAN manager 20, can discover the SAN topology and attributes. To this end, self-registering (or compliant) components issue appropriate platform registration commands to the interconnect 16, e.g., the RPL Fabric Configuration Server request detailed in the fibre channel specification at Section 6.1.4.23, providing requisite parameters for registration, e.g., the following parameters also detailed in the aforementioned section of the fibre channel specification:

| Parameter (per fibre channel specification) | Short Name (per FIG. 2 hereof) |
|---|---|
| CT_IU preamble | |
| Platform Name | "Name" |
| Platform Type | "Type" |
| Number of Management Address entries (n) | "Management Address List" |
| Management Address #1 | |
| Management Address #2 | |
| . . . | |
| Management Address #n | |
| Number of Platform Node Name entries (n) | "Node List" |
| Platform Node Name #1 | |
| Platform Node Name #2 | |
| . . . | |
| Platform Node Name #n | |

The configuration server makes this information available, in turn, upon request of any component on the interconnect fabric. In the illustrated embodiment, such requests are issued, for example, by the agents on behalf of the SAN manager 20, e.g., during in-band discovery.

Manual Platform Registration

In the illustrated embodiment, a novel manual registration module 22 attends to registration of hosts 12, storage devices 14 and other components of the SAN that are not capable (or do not otherwise) self-register with the configuration service (referred to below as "non-compliant" components). The module 22 beneficially executes on the same digital data processor as the SAN manager 20 and, indeed, can be packaged for installation and execution therewith. In other embodiments, the module 22 can be execute on other digital data devices (not shown) that communicates to the interconnect 16 via hosts 12 or other components on that interconnect 16. Illustrated manual platform registration module 22 is coupled with the console 24 associated with SAN manager 20 (and, specifically, via SAN Manager Console GUI shown in FIG. 3 and described, in further detail, in incorporated-by-reference application, U.S. Ser. No. 09/972,584 and particularly, by way of non-limiting example, in FIGS. 4-6 and 36, and the accompanying text thereof) and utilizes the aforementioned GUI to present information to the administration and accept input therefrom. In alternative embodiments, the module utilizes a separate display and/or graphical (or other) interface functionality.

Because it need not directly interface the interconnect 16 and its constituent configuration server 18—relying, instead, on hosts 12 or other SAN components for that purpose—implementation and operation of module 22 is greatly facilitated. This proves further true where, as in the illustrated embodiment, the module 22 relies on the GUI provided by manager 20 (or other digital data devices) and console 24 to interface with the operator.

The module 22 can be invoked by the administrator (e.g., via a menu option on the SAN manager 20 or otherwise), automatically (e.g., in response to detection by SAN manager 20 of addition of a component to the SAN), or otherwise, to register a component in the first instance or to modify the parameters of a previously registered component. It can likewise be invoked to cancel a component registration.

As depicted in FIG. 2, module 22 utilizes the console 24 to obtain from the administrator information concerning a host 12, storage device 14 or other non-compliant component to be registered. Specifically, it obtains for the component to be registered the name, type, node list, and management address list, which correspond to parameters expected in the configuration server as indicated in the table above. That information is communicated to a host 12 agent, along with an 20 indication that it is to be included in an RPL Fabric Configuration Server command (or other such command) for issuance to the interconnect 16. The agent, in turn, issues the RPL Fabric Configuration Server command (or other such command), for entry of the information into the configuration server 18. This has the effect of registering the non-compliant component with the fibre channel interconnect 16, e.g., as if that component had registered itself with the server 18.

Information for the non-compliant component may henceforth be obtained by other components from configuration server 18 in the usual manner, e.g., through issuance of queries to the server 18. Among other benefits, this facilitates discovery and management of non-compliant components, e.g., in instances where only in-band discovery is possible. By way of example, components querying the interconnect 16 subsequent to registration of a non-compliant component (by module 22) can obtain information from the server 18 to determine not only how the physical network endpoints, or ports, are connected but also which hosts 12 or storage devices 14 those ports are contained in.

Automatic Platform Registration

Figure 4:
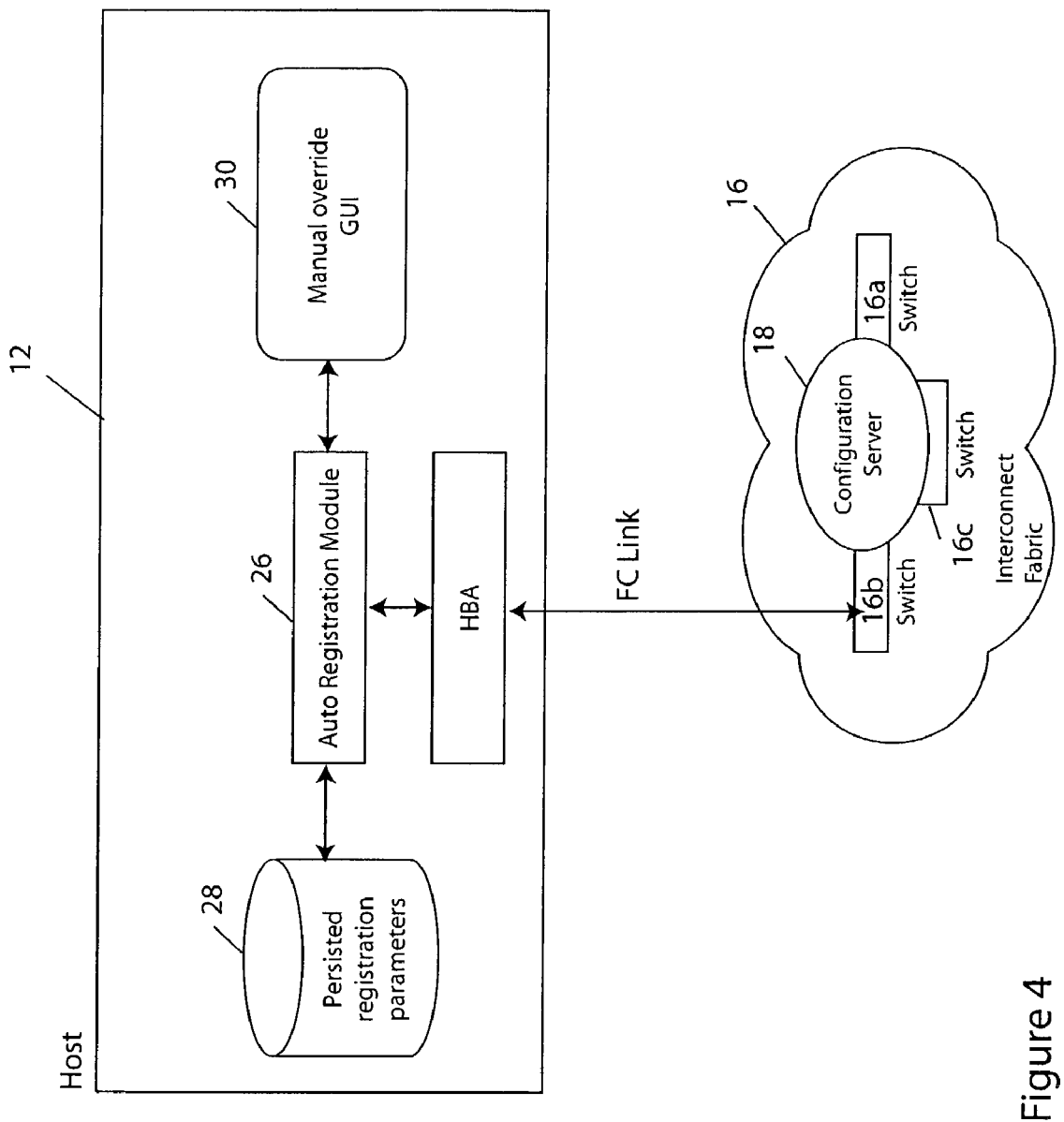
FIG. 4 depicts an automated registration module according to the invention.

In addition to, or instead of, manual registration, some embodiments of the invention provide for automatic platform registration. Referring to FIG. 4, automated platform registration module 26 comprises "agent" or other process that executes directly on a host 12. In the illustrated embodiment, this is a stand-alone process, though, it can form part of and/or execute in connection with an aforementioned agent tier of the SAN manager 20. In some embodiments, the automated platform registration module 26 commences operation on boot-up of the host 12 on which it resides, performs registration, then terminates. Though intended for execution on host-type SAN components, e.g., servers, workstations and other digital data processors, the automated platform registration module 26 can execute on other types of SAN components, e.g., storage devices, e.g., via an embedded operating system, or otherwise.

Illustrated module 26 obtains from pre-programmed default settings and/or from a persisted database 28 (or other store) registration parameters for the local host 12 (i.e., the host on which the module resides) and/or one or more other non-compliant hosts 12, devices 14 or other SAN components. To the extent database 28 is used, information contained in it can be preset or it can derive from information entered by the administrator, e.g., upon installation of each respective component, or obtained otherwise (e.g., from a manufacturer's or service provider's web site). To facilitate entry of such information into the database by the administrator, a graphical user interface 30 can be supplied which presents displays (e.g., of the sort depicted in FIG. 2) on a console (not illustrated) and obtains from the administrator requisite parameters for each non-compliant component for which registration information is to be persisted in the database 28.

Regardless, the module 26 obtains (from the database, from preprogrammed defaults or otherwise) for each component to be registered the name, type, node list, and management address list, which correspond to parameters expected in the configuration server as indicated in the table above. As with the manual registration module 22, the module 26 formats the information as necessary per the fibre channel specification and issues RPL Fabric Configuration Server or other commands for its entry into the configuration server 18. From that point onward, the SAN manager 20 (or other requester coupled to the fabric 16) can obtain information regarding the otherwise non-compliant component as if it had registered itself in accord with the fibre channel specification. Communications between the automatic registration module 26 and the configuration server 18 can be handled via the local host 12 HBA in the conventional manner.

Described above are methods and apparatus for registering hosts, storage devices and other non-compliant SAN components with a platform registration service of the type discussed, for example, in the aforementioned fibre channel specification. Those skilled in the art will appreciate that the invention has application beyond SAN components and can be extended, for example, to elements of the fabric 16, such as switches, gateways, and the like. Moreover, it will be appreciated that the invention can be applied to storage area and other networks that operate with protocols other than fibre channel. In view of the foregoing and understanding that the illustrated embodiments are merely examples of the invention, and further understanding that apparatus and methods incorporating modifications thereto fall within the scope of the invention,

What we claim is:

1. A computer readable storage medium embodying a program of machine-readable instructions executable by a digital processing apparatus to perform an operation for storage area network registration, the operation comprising:

obtaining component registration information for a noncompliant component, wherein the component registration information is compliant with a communication network registration protocol and the noncompliant component lacks capability to self-register with a storage area network using the communication network registration protocol;

communicating the component registration information to a compliant component registered with the storage area network; and registering the component registration information for the noncompliant component with the storage area network, wherein the compliant component registers the component registration information on behalf of the noncompliant component.

2. The computer readable storage medium of claim 1, wherein the storage area network operates in accord with a fibre channel protocol (FCP).

3. The computer readable storage medium of claim 1, wherein the storage area network further comprises one or more configuration servers that register the component registration information on behalf of the noncompliant component.

4. The computer readable storage medium of claim 1, wherein the component registration information comprises at least one of a component name, a component type, a management address list, and a node list.

5. The computer readable storage medium of claim 1, further comprising obtaining component registration information for a non-compliant component from a user.

6. The computer readable storage medium of claim 5, wherein obtaining the component registration information further comprises obtaining the registration information from the user using a console.

7. The computer readable storage medium of claim 6, wherein obtaining the registration information further comprises deploying a graphical user interface (GUI) on the console for entry of the registration information.

8. The computer readable storage medium of claim 1, wherein the compliant component registers the non-compliant component automatically.

9. The computer readable storage medium of claim 1, wherein registering occurs at start-up of the noncompliant component.

10. The computer readable storage medium of claim 9, further comprising providing a persisted database configured to store component registration information of the noncompliant component.

11. The computer readable storage medium of claim 10, wherein the compliant component retrieves the component registration information from the persisted database.

12. The computer readable storage medium of claim 10, wherein the component registration information of the non-compliant component is stored in the persisted database prior to startup of the noncompliant component.

13. The computer readable storage medium of claim 10, further comprising updating the persisted database with the updated registration information while the noncompliant component is operational.

14. A system for storage area network registration, the system comprising:

a storage area network including a plurality of components, wherein the components are registered in a storage area network registry according to a communication network registration protocol;

a noncompliant component that lacks capability to self-register with the storage area network using the communication network registration protocol;

a compliant component configured to obtain component registration information for the noncompliant component and to register the component registration information with the storage area network on behalf of the noncompliant component, wherein the component registration information is compliant with the communication network registration protocol.

15. The system of claim 14, wherein the storage area network operates in accord with a fibre channel protocol (FCP).

16. The system of claim 14, wherein the storage area network further comprises one or more configuration servers that register the component registration information on behalf of the noncompliant component.

17. The system of claim 14, wherein the component registration information comprises at least one of a component name, a component type, a management address list, and a node list.

18. The system of claim 14, further comprising obtaining component registration information for a non-compliant component from a system user.

19. The system of claim 18, wherein the obtaining component registration information further comprises obtaining the registration information from the system user on a console.

20. The system of claim 19, wherein obtaining the component registration information from the system user further comprises deploying a graphical user interface (GUI) on the console for entry of the component registration information.

21. The system of claim 14, wherein the compliant component registers the non-compliant component automatically.

22. The system of claim 21, wherein registering occurs at start-up of the noncompliant component.

23. The system of claim 14, further comprising a storage device with a persistent database comprising component registration information of the noncompliant component and the compliant component retrieves the component registration information from the persistent database.

24. The system of claim 23, wherein the component registration information of the noncompliant component is stored in the persisted database prior to startup of the noncompliant component.

25. The system of claim 14, wherein the communication network registration protocol is an American National Standard for Information Technology T11/FC-GS protocol.

26. The system of claim 23, further comprising updating the storage device with the component registration information while the noncompliant component is operational.

27. A method for storage area network registration, the method comprising:

obtaining component registration information for a noncompliant component, wherein the component registration information is compliant with a communication network registration protocol and the noncompliant component lacks capability to self-register with a storage area network using the communication network registration protocol;

communicating the component registration information to a compliant component registered with the storage area network; and registering the component registration information for the noncompliant component with the storage area network, wherein the compliant component registers the component registration information on behalf of the noncompliant component.

28. The method of claim 27, wherein the storage area network operates in accord with a fibre channel protocol (FCP).

29. The method of claim 28, wherein the storage area network further comprises one or more configuration servers that register the component registration information on behalf of the noncompliant component.

30. The method of claim 29, wherein the component registration information comprises at least one of a component name, a component type, a management address list, and a node list.

31. The method of claim 30, further comprising obtaining component registration information for a non-compliant component from a user.

32. The method of claim 31, wherein the obtaining component registration information further comprises obtaining the component registration information from the user via a console.

33. The method of claim 31, wherein obtaining the component registration information from the user further comprises deploying a graphical user interface (GUI) on the console for entry of the registration information.

34. The method of claim 27, wherein the compliant component registers the non-compliant component automatically.

35. The method of claim 34, wherein registering occurs at start-up of the noncompliant component.

36. The method of claim 27, further comprising retrieving the component registration information from a persistent database.

37. The method of claim 36, further comprising inputting the component registration information to the persistent database via a user interface.

38. The method of claim 37, wherein inputting the component information to the database further comprises inputting the component registration information prior to startup of the noncompliant component.

39. The method of claim 38, further comprising updating the persistent database with updated component registration information while the noncompliant component is operational.

* * * * *